United States Patent
Ward (10) Patent No.: US 9,630,663 B1
(45) Date of Patent: Apr. 25, 2017

(54) TRACK SYSTEM AND METHOD FOR USE WITH RUBBER TIRE EQUIPMENT

(75) Inventor: Curtis Ward, Greensburg, IN (US)

(73) Assignee: Ward Equipment, LLC, Greensburg, IN (US)

( * ) Notice: Subject to any disclaimer, the term of this patent is extended or adjusted under 35 U.S.C. 154(b) by 506 days.

(21) Appl. No.: 13/008,387

(22) Filed: Jan. 18, 2011

Related U.S. Application Data (60) Provisional application No. 61/295,662, filed on Jan. 15, 2010.

(51) Int. Cl.
*B62D 55/04* (2006.01)
*B62D 55/205* (2006.01)

(52) U.S. Cl.
CPC ........... *B62D 55/04* (2013.01); *B62D 55/205* (2013.01)

(58) Field of Classification Search
CPC .... B62D 55/04; B62D 55/275; B62D 55/205; B62D 55/202
USPC ......... 305/51, 187, 189, 190, 191, 192, 193, 305/195, 200, 201; 180/9.21, 9.26, 9.28
See application file for complete search history.

(56) References Cited

U.S. PATENT DOCUMENTS

| | | | | |
|---|---|---|---|---|
| 1,635,596 A * | 7/1927 | White | ............................ | 305/162 |
| 1,786,924 A * | 12/1930 | Turnbull | ........................ | 305/201 |
| 2,345,763 A * | 4/1944 | Mayne | .......................... | 305/180 |
| 2,755,146 A * | 7/1956 | Galanot | ......................... | 305/110 |
| 4,359,248 A * | 11/1982 | Kortering | ........................ | 305/46 |
| 4,470,641 A * | 9/1984 | Swarthout | ...................... | 305/189 |
| 5,429,429 A * | 7/1995 | Loegering et al. | ........... | 305/193 |
| 5,951,124 A | 9/1999 | Hoffart | | |
| 6,010,199 A | 1/2000 | Hoffart | | |
| 6,299,265 B1 | 10/2001 | Hoffart | | |
| 6,447,077 B1 * | 9/2002 | Durick et al. | ................ | 305/201 |
| 6,464,309 B2 | 10/2002 | Doyle | | |
| 6,478,389 B2 | 11/2002 | Doyle | | |
| 7,156,473 B2 * | 1/2007 | Hori et al. | .................... | 305/187 |

OTHER PUBLICATIONS

Complaint by Grouser Products, Inc., and Ronald J. Hoffart from Cass County District Court, Civil No. unknown, Feb. 8, 2011, 5 page.

Summons by Grouser Products, Inc., and Ronald J. Hoffart from Cass County District Court, Civil No. unknown, Feb. 8, 2011, 1 pages.

Notice of Removal by Ward Equipment, LLC from Cass County District Court, case number unknown. Filing fee $350 receipt No. FA002366 filed by Ward Equipment, LLC. (Attachments: #1 Cass County Summons and Complaint, #2 Civil Cover Sheet(1h) (Entered: Mar. 7, 2011), 9 pages.

Answer to Complaint (Notice of Removal), Counterclaim against All Plaintiffs by Ward Equipment, LLC. (Plambeck, Stephen) (Entered: Mar. 22, 2011), 6 pages.

(Continued)

*Primary Examiner* — Drew Brown
(74) *Attorney, Agent, or Firm* — Perkins Coie LLP (57) ABSTRACT

A track system for use with multiple in-line wheels of a vehicle is disclosed. The track includes a plurality of track members linked together forming a loop encircling the wheels. The track members each include a base, sidewalls, and a removable shoe. The shoe can be bolted to the base and can be removed from the base. The shoe can have a rubber pad, a grouser, or another tread.

15 Claims, 6 Drawing Sheets

(56) References Cited

OTHER PUBLICATIONS

Order for Rule 26(f) Planning Meeting and Rule 16(b) Scheduling Conference, and Order regarding resolution of Discovery Disputes by Magistrate Judge Karen K. Klein. Scheduling Conference set up for May 4, 2011 at 10:30 AM in Chambers before Magistrate Judge Karen K. Klein (NJM) (Entered: Mar. 24, 2011), 5 pages.
Civil Docket for Case No. 3-11-cv-00023-RRE-KKKM dated Mar. 7, 2011, 2 pages.

* cited by examiner

TRACK SYSTEM AND METHOD FOR USE WITH RUBBER TIRE EQUIPMENT

CROSS-REFERENCE TO RELATED APPLICATION

The present application claims priority to and the benefit of U.S. Provisional Application No. 61/295,662 filed Jan. 15, 2010 and titled TRACK SYSTEM AND METHOD FOR USE WITH RUBBER TIRE EQUIPMENT, which is incorporated herein by reference in its entirety.

TECHNICAL FIELD

The present disclosure is directed to track systems having removable grousers for use with rubber tire equipment.

BACKGROUND

Various tire chains and track systems have been used to improve vehicle and equipment control over soft, slippery, or uneven terrain. Excavators, Skid loader equipment such as the BOBCAT®, and other such equipment are typically equipped with large rubber tires that offer sufficient traction for many circumstances. For extremely rough terrain, a track system can be used around the tires as a continuous-loop tread similar to a tank tread. Some track systems include contoured contact surfaces having cleats, treads, or other traction-enhancing features. Some of this equipment may damage the ground beneath the vehicle, making these track systems unsuitable for operation on more delicate surfaces such as landscaped lawns, sidewalks, and even paved streets. Many existing track systems are not equipped to operate on both types of surfaces without either giving up maneuverability on rough terrain or damaging more delicate surfaces.

DETAILED DESCRIPTION

The present disclosure describes systems and methods for providing a track system for use with vehicles having rubber tires. The track system includes a series of track members linked together to form a continuous loop positioned over at least two tires of the vehicle to improve traction. The disclosure is directed to tracks and track systems including removable shoes removably attached to the track members.

Certain details are set forth in the following description and in FIGS. 1-6 to provide a thorough understanding of various embodiments of the disclosure. However, other details describing well-known structures and systems often associated with vehicles and track systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Figure 1:
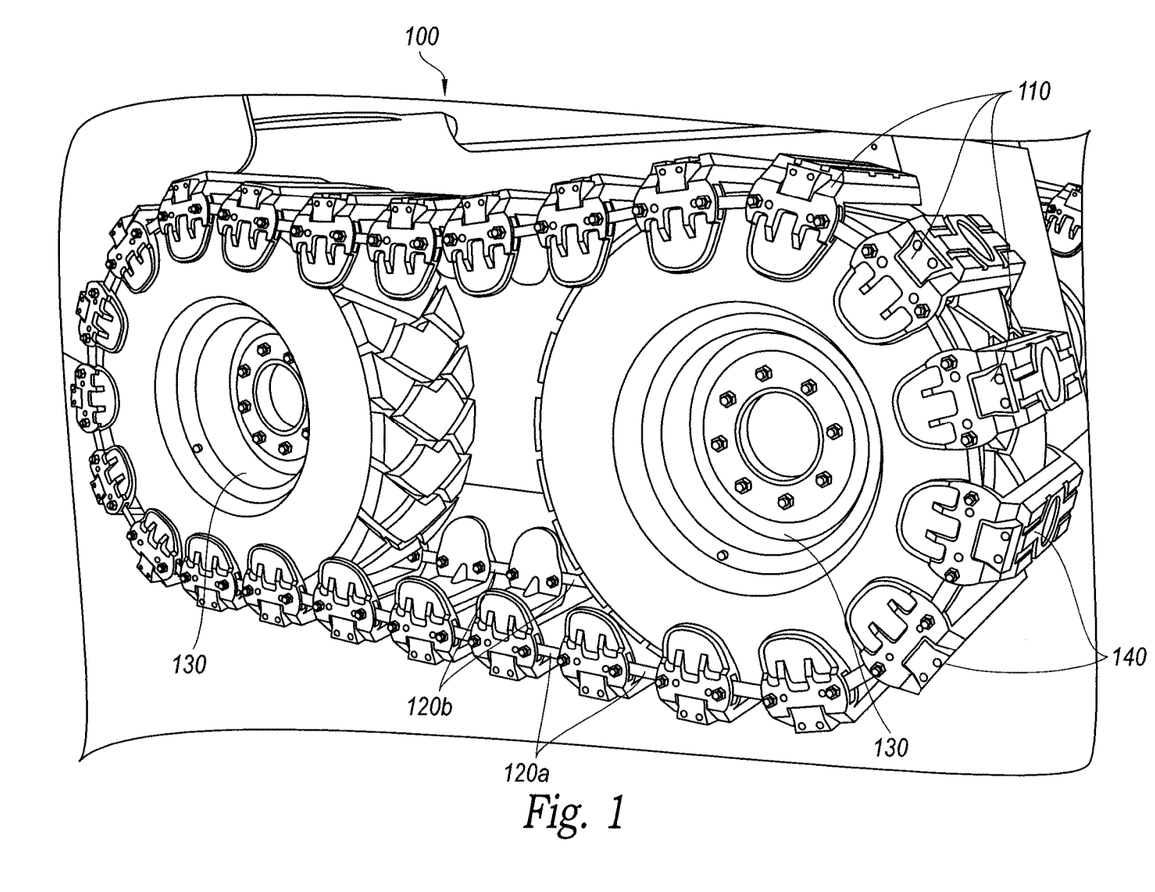
FIG. 1 is an isometric view of a track system in place on a pair of vehicle tires according to embodiments of the present disclosure.

FIG. 1 illustrates embodiments of the present disclosure including a track 100 for a vehicle comprising several track members 110 linked together by links 120. The track members 110 and links 120 form a continuous loop positioned around wheels and tires 130 of the vehicle. The track 100 can be large enough to contain the tires 130 with a slight degree of slack. The slack is visible at the top of the track 100 between the tires 130. The track members 110 include a removable shoe 140 (i.e. grouser) that contacts the ground as the vehicle moves along the ground. The track members 110 also include sidewalls 118 extending inward toward the tires 130 and surrounding a portion of the tires 130 to maintain the track 100 in position on the tires 130. The links 120 connect adjacent track members 110 loosely to permit the track members 110 to flex around the tires 130 as the vehicle travels. The links 120 can include exterior links 120a and interior links 120b on either side of the tires 130. The track 100 provides improved traction and maneuverability in rough terrain.

Figure 2:
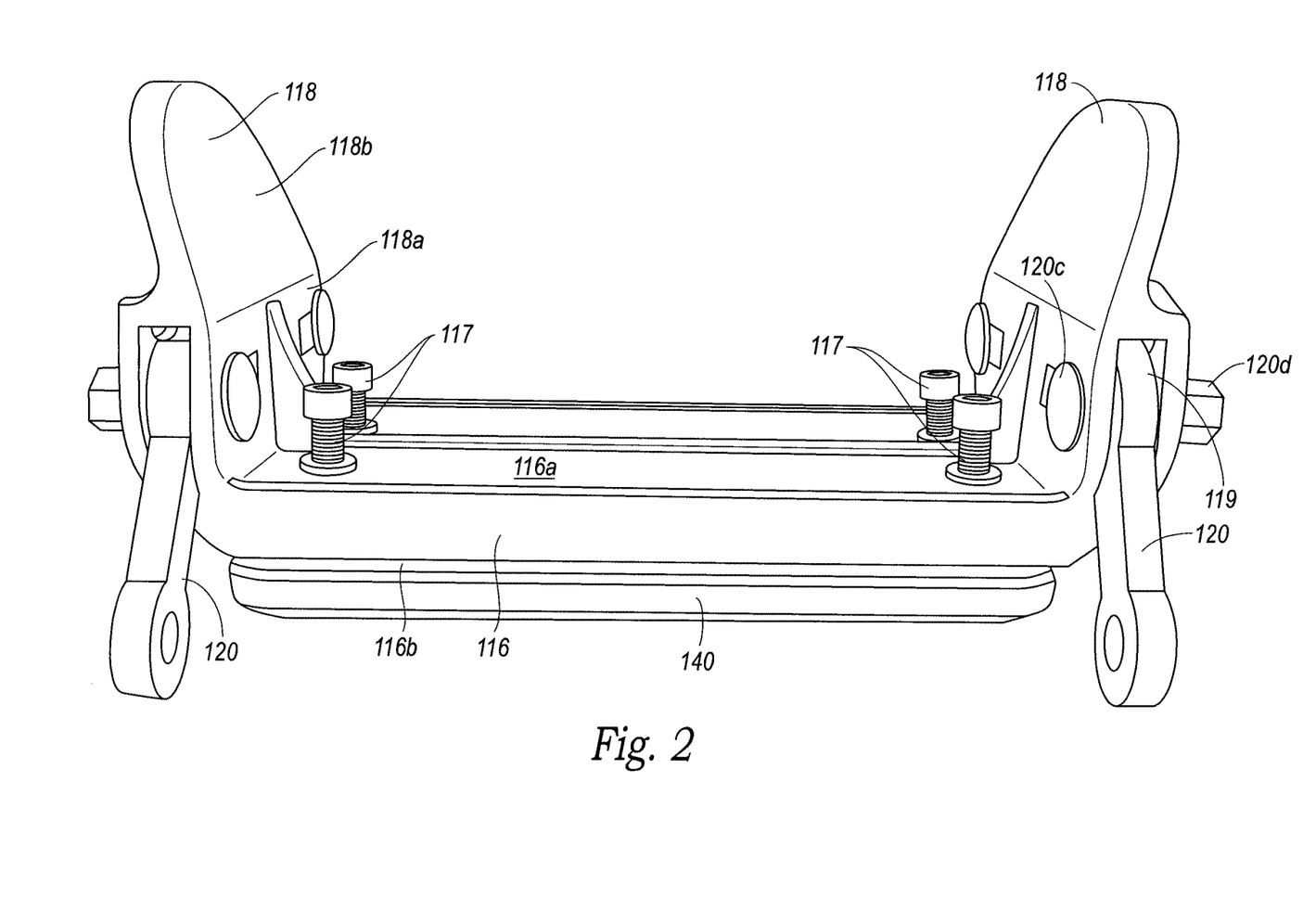
FIG. 2 is a front view of a track member of a track system, including a base, sidewalls, and a removable shoe according to embodiments of the present disclosure.
Figure 3:
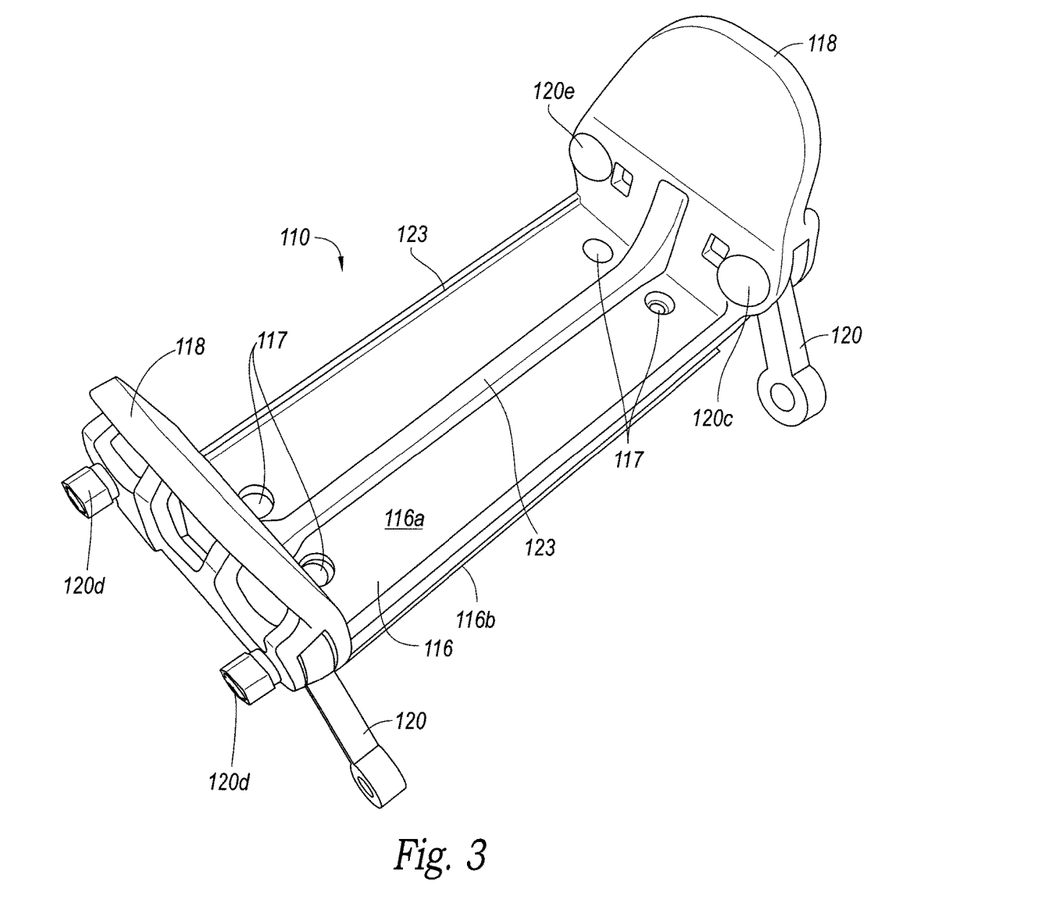
FIG. 3 is an isometric top view of a track member of a track system, including a base, sidewalls, and a removable shoe according to embodiments of the present disclosure.

FIG. 2 is a front view of a single track member 110 according to several embodiments of the present disclosure. FIG. 3 illustrates the track member 110 from an elevated, isometric view. Referring to FIGS. 2 and 3, the track member 110 comprises a base 116, sidewalls 118, links 120 connected to the sidewalls 118, and a shoe 140 attached to the base 116. The base 116 has an interior surface 116a facing inwardly, toward the tires when the track 100 is assembled, and an exterior surface 116b facing outwardly, away from the tires. The interior surface 116a can include a contoured surface, such as ridges 123, to improve traction between the tire and the track member 110. Other surface features can be used, including non-linear ridges, knurling, studs, or any other type of traction-improving texture. The surface texture of the interior surface 116a can be chosen based in part upon the size, type, and tread of the tires.

The base 116 includes through-holes 117, and the shoe 140 is attached to the exterior surface 116b by bolts (shown in place but not tightened) passing through the holes 117. The shoe 140 includes blind, tapped holes as well that receive the bolts through the holes 117 to secure the shoe 140 to the base 116. The blind holes in the shoe 140 prevent the bolts from protruding through the shoe 140 and contacting the ground. Other fastening mechanisms can be used to secure the shoe 140 to the base 116. The bolts can be removed from the base 116, and the shoe 140 can therefore be removed from the track member 110 and replaced with a different shoe 140 having a different surface aspect as needed. In some embodiments, the shoe 140 includes a contact surface made of rubber, metal, or another suitable material. Some shoes 140 can include a textured surface having ridges, cleats, or other high traction surfaces. A flat, rubber contact surface on the shoe 140 can provide improved traction compared with standard tires, but is also able to traverse more delicate surfaces such as sidewalks, pavement, and landscaped lawns. The shoe 140 can also be replaced after being worn from extended use. Also, if a single shoe 140 in the track 100 is damaged, it can be replaced with a fresh shoe 140 without needing to remove the track 100 from the tires, and at minimal expense.

The sidewalls 118 extend from the base 166 upwardly and outwardly in a manner to receive a tire. In some embodiments, the sidewalls 118 include a first, proximal portion 118a that extends generally perpendicularly to the base 116, and a second, distal portion 118b that extends slightly outwardly. The degree of outward slope can be determined based on the profile of tires with which the track 100 is to be used. The dimensions of the sidewalls 118 can also be chosen to properly hold the track member 110 in place relative to the tire without adding unnecessary weight or interfering with the movement as the track 100 rolls around the tires.

The sidewalls 118 include slots 119 that are configured to receive the links 120. Bolts 120c can extend through holes in the sidewalls 118 and through the links 120. The bolts 120c can be threaded at an end to fasten to a nut 120d, but rounded through most of the bolt shaft to permit the links 120 to rotate relative to the sidewalls 118 as the track 100 rolls around the tires. The bolts 120c can include a flat, low-profile head 120e on an interior surface of the sidewalls 118 to avoid damaging the tires.

Figure 4:
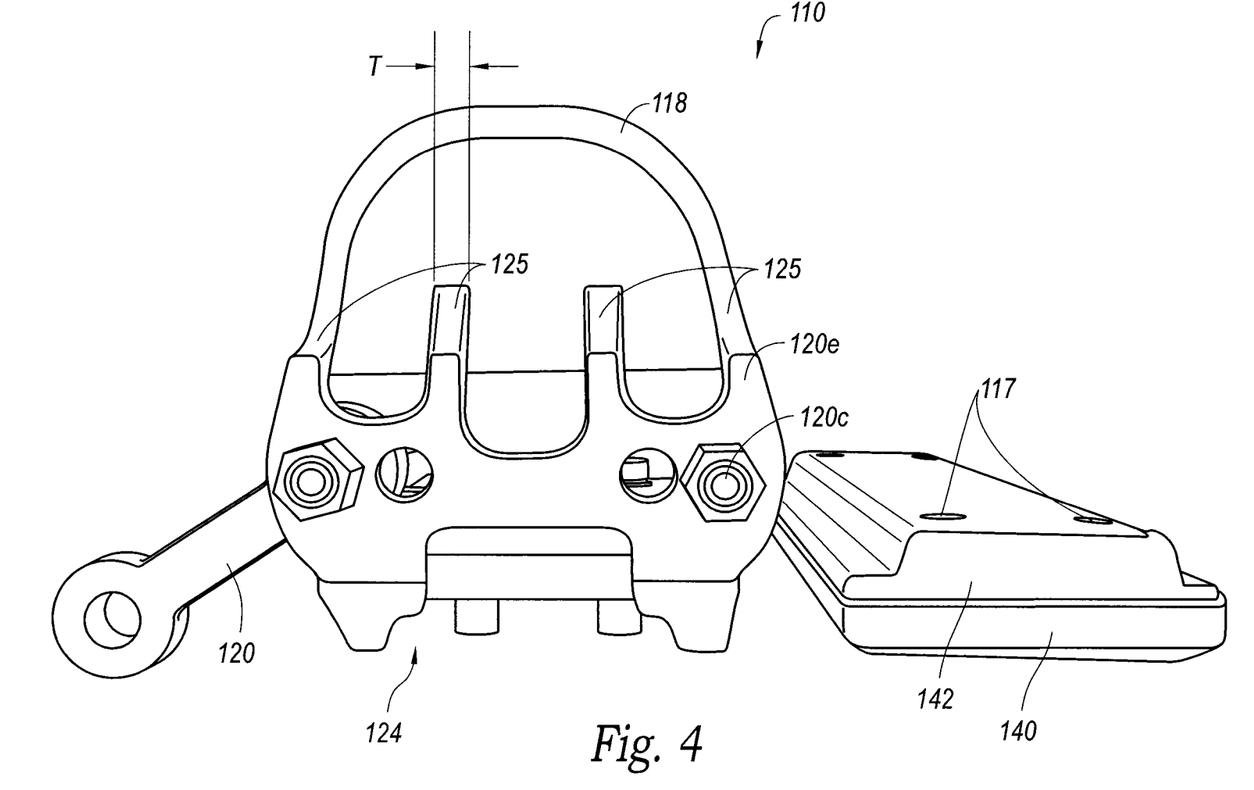
FIG. 4 is an end view of a track member and removable shoe according to embodiments of the present disclosure.

FIG. 4 is an end view of a track member 110 and shoe 140 according to several embodiments of the present disclosure. The exterior surface 116b of the base 116 can have a recess 124, and the shoe 140 can have a matching, opposite protrusion 142 configured to fit within the recess 124. The non-planar profiles of the base 116 and the shoe 140 can secure the shoe 140 in contact with the base 116. Other recess/protrusion paired profiles can be used, including non-linear and/or multiple discrete recesses and protrusions. In other embodiments the base 116 can have the protrusion and the shoe 140 can have the recess.

The sidewalls 118 can include strengthening members 125 at a proximal portion 118a of the sidewalls 118. These members 125 can be relatively thin in a dimension T, but can be larger in a perpendicular direction parallel with the base 116. The strengthening members 125 therefore act like buttresses to support the upwardly extending sidewalls 118.

Figure 5:
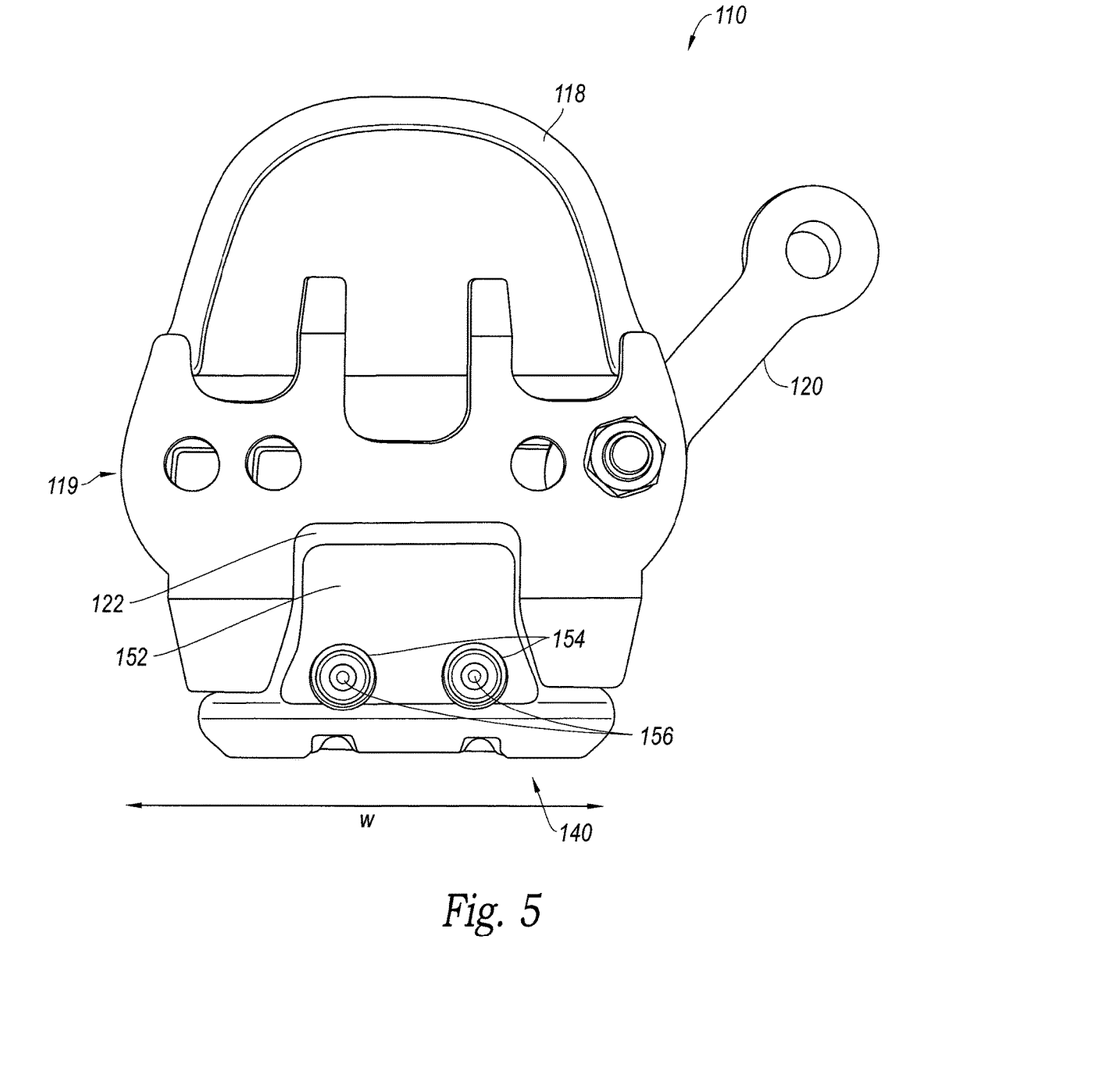
FIG. 5 is an end view of a track member and shoe according to embodiments of the present disclosure.

FIG. 5 illustrates an end view of a track member 150 according to another embodiment of the present disclosure, in which the shoe 140 includes a tab 152 having holes 154 and bolts 156 to secure the shoe 140 to the base 116. The tab 152 extends around the ends of the base 116. The base 116 includes tapped holes to receive the bolts 156 through the tabs 152. The bolts 156 extend at least generally parallel to the base 116 and to the ground. FIG. 5 also shows the link 120 in a rotated position relative to the track member 110.

Figure 6:
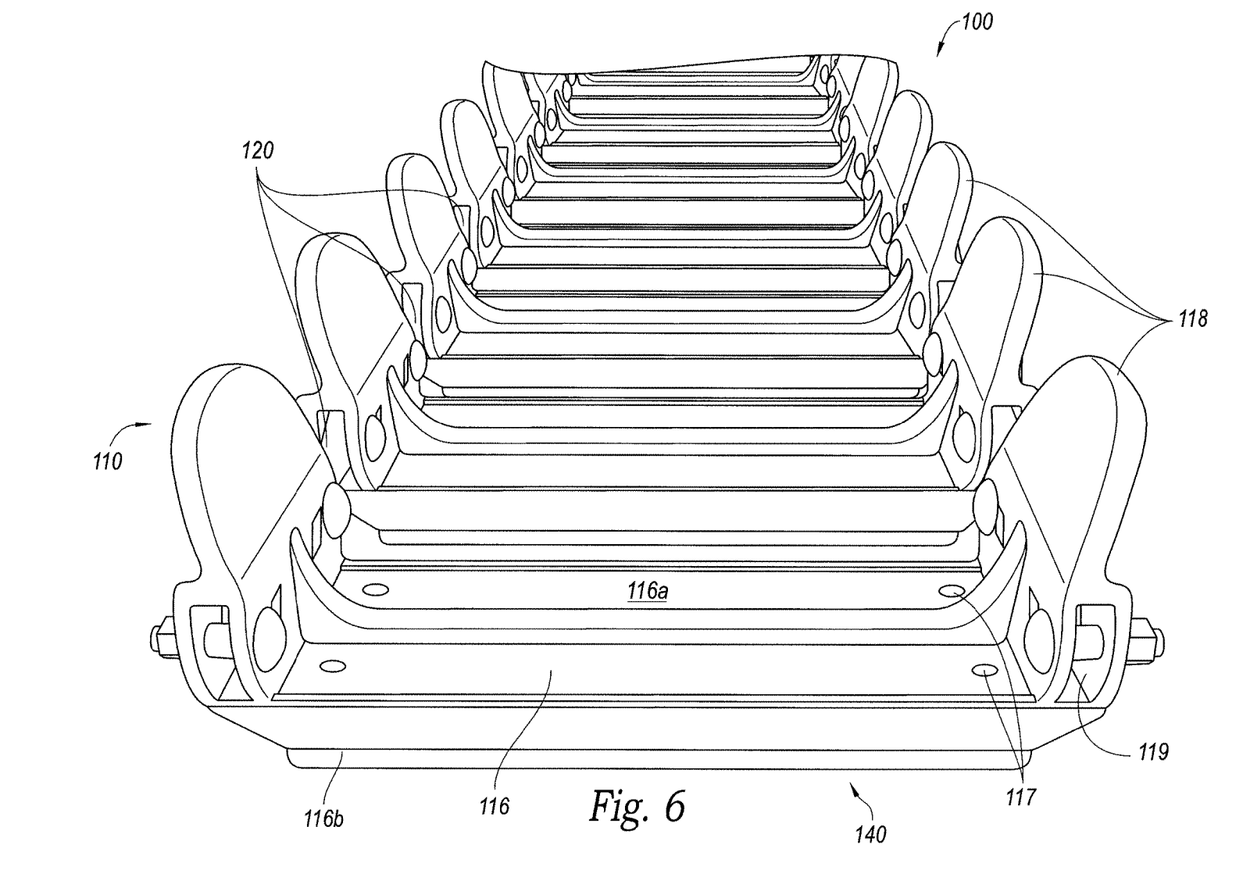
FIG. 6 is a top view of an unassembled track system according to embodiments of the present disclosure.

FIG. 6 shows a track 100 according to several embodiments of the present disclosure. The track 100 is open at one end to allow a vehicle to drive onto the track 200, which can then be looped around the wheels and linked together to form a continuous track loop. The sidewalls 118 are rounded or sloped so that when the track members 110 rotate relative to adjacent track members 110 the sidewalls 118 do not touch. The track members 110 can have shoes 140 attached via the vertical bolts and bolt holes 117 passing through the base 116 and transverse to the interior surface 116a, or they can be attached via the lateral bolt arrangement shown in FIG. 5. In some embodiments, the shoes 140 can be attached to the base 116 using both bolt arrangements.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

I claim:

1. A track member for use with other, similar track members to form a continuous track for use with equipment having rubber tires, the track member comprising:
   a base having a single generally planar member having an interior surface, an exterior surface opposite the interior surface, and a first end and a second end, wherein a structural support ridge extends from a first end to a second end on the interior surface;
   two sidewalls, a respective one of said sidewalls at each end of the base, the sidewalls extending away from the interior surface of the base at least generally perpendicular to the base and outwardly from the base, wherein the two sidewalls and the interior surface of the base together form a U-shaped recess configured to receive a tire;
   two individual link members, a respective link member at each side wall, each link member having a first connector rotatably fastened to the corresponding side wall and a second connector configured to rotatably fasten to an adjacent track member; and
   a shoe removably attached to the base at the exterior surface of the base wherein the exterior surface of the base comprises a non-planar shape, and wherein the shoe comprises a corresponding, opposite non-planar shape configured to match the non-planar shape of the exterior surface of the base.

2. The track member of claim 1 wherein the shoe comprises at least one of a rubber contact surface facing away from the exterior surface of the base and a metal contact surface facing away from the exterior surface of the base.

3. The track member of claim 1 wherein walls of the individual sidewalls define:
   a slot in the side wall configured to receive the first connector of a link member, and
   a hole through the side wall configured to receive a bolt, the bolt being attached to the first connector of the link member, wherein the bolt is configured to permit the link member to rotate about the bolt.

4. The track member of claim 1 wherein the shoe is bolted to the base by a plurality of bolts passing through the base at least generally perpendicularly to the interior surface of the base.

5. The track member of claim 4 wherein the plurality of bolts comprises two bolts arranged near a first end of the base and two bolts arranged near a second end of the base.

6. The track member of claim 1 wherein the interior surface of the base comprises a plurality of ridges extending between the ends of the base.

7. The track member of claim 1 wherein the non-planar shape of the base comprises a linear groove extending between the two ends of the base, and wherein the opposite non-planar shape of the shoe comprises a linear ridge configured to fit within the linear groove.

8. The track member of claim 1 wherein the links comprise an elongated member with a hole at each end.

9. The track member of claim 1 wherein the shoe is attached to the base via bolts passing through the base and generally perpendicular to the interior surface of the base.

10. The track member of claim 1 wherein the shoe is attached to the base via bolts extending at least generally parallel with the interior surface of the base.

11. The track member of claim 10 wherein the shoe further comprises upwardly extending tabs configured to surround at least a portion of the base at ends of the base, and wherein the bolts pass through holes in the tabs.

12. The track member of claim 1 wherein the sidewalls comprise a proximate portion extending at least generally perpendicular to the interior surface of the base, and a distal portion extending from the proximate portion and outwardly from the base, wherein the sidewall includes a strengthening member generally orthogonal to the base.

13. A track configured to encircle at least two tires of a vehicle, the track comprising:

a plurality of track members, individual track members comprising:

a base, and sidewalls extending inwardly from the base wherein the sidewalls comprise a proximate portion extending at least generally perpendicular to the interior surface of the base, and a distal portion extending from the proximate portion and outwardly from the base, wherein the sidewall includes a strengthening member generally orthogonal to the base;

a plurality of link members connected to the track members, wherein each adjacent pair of track members is connected to at least one link member, and wherein the track members and link members form a continuous track configured to encircle the tires of the vehicle with the base and sidewalls of the track members receiving the tires of the vehicle, and a plurality of shoes releasably attached to the base of the track members, wherein the shoes are at least generally coextensive with the base, wherein the base of individual track members comprises a non-planar surface facing outwardly from the track, and wherein the shoes comprise a matching, opposite non-planar surface configured to engage the base of the track members.

14. The track of claim 13 wherein the shoes are bolted to the base of the track members.

15. The track of claim 13 wherein individual shoes comprise at least one of a rubber surface and a contoured, metal surface.

* * * * *